(12) United States Patent
Lin et al.

(10) Patent No.: US 8,269,549 B2
(45) Date of Patent: Sep. 18, 2012

(54) POWER SUPPLY CIRCUIT FOR PCI-E SLOT

(75) Inventors: Cheng-Chung Lin, New Taipei (TW); Wu Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 84 days.

(21) Appl. No.: 13/048,973

(22) Filed: Mar. 16, 2011

(65) Prior Publication Data

US 2012/0161849 A1    Jun. 28, 2012

(51) Int. Cl.
*G11C 5/14* (2006.01)
(52) U.S. Cl. ......................................... 327/530; 327/427
(58) Field of Classification Search .................. 327/427, 327/434, 530
See application file for complete search history.

(56) References Cited

U.S. PATENT DOCUMENTS

| | | | | |
|---|---|---|---|---|
| 3,671,931 A | * | 6/1972 | Loofbourrow | 367/67 |
| 5,396,120 A | * | 3/1995 | Iwasa et al. | 327/512 |
| 6,282,666 B1 | * | 8/2001 | Bays et al. | 713/323 |
| 7,930,570 B2 | * | 4/2011 | Zou et al. | 713/300 |
| 8,145,933 B2 | * | 3/2012 | Xi | 713/323 |
| 2006/0232324 A1 | * | 10/2006 | Huang et al. | 327/530 |
| 2011/0291739 A1 | * | 12/2011 | Albean | 327/434 |

* cited by examiner

*Primary Examiner* — Lincoln Donovan
*Assistant Examiner* — William Hernandez
(74) *Attorney, Agent, or Firm* — Altis Law Group, Inc.

(57) ABSTRACT

A power supply circuit for a PCI-E slot includes a control chip, a first electronic switch, and a second electronic switch. The control chip determines a status of a motherboard, outputting a control signal. A first terminal of the first electronic switch is connected to the control chip to receive the control signal, and connected to a +3.3V dual power supply of the motherboard through a first resistor. A second terminal of the first electronic switch is grounded. A third terminal of the first electronic switch is connected to a first terminal of the second electronic switch, and connected to the +3.3V dual power supply through a second resistor. A second terminal of the second electronic switch is connected to the +3.3V dual power supply. A third terminal of the second electronic switch is connected to a PCI-E slot.

4 Claims, 1 Drawing Sheet

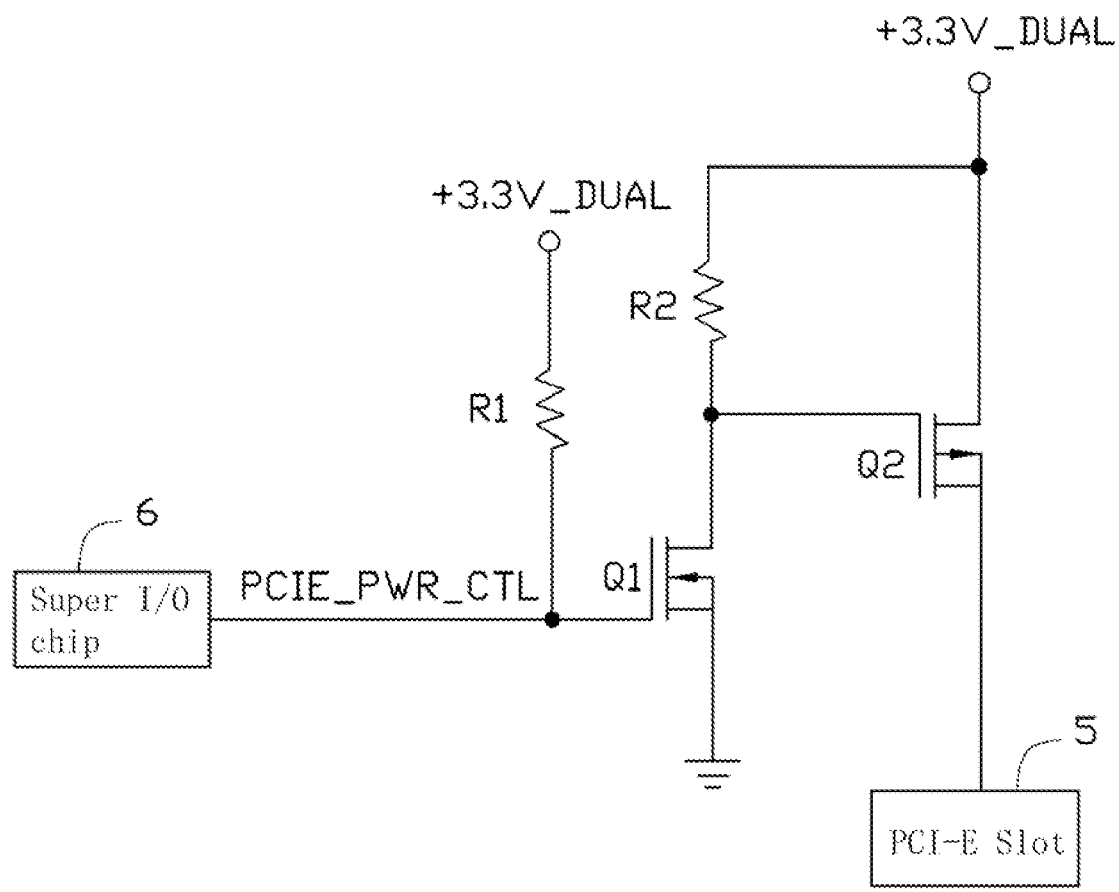

POWER SUPPLY CIRCUIT FOR PCI-E SLOT

BACKGROUND

1. Technical Field

The present disclosure relates to a power supply circuit for a Peripheral Component Interconnect Express (PCI-E) slot.

2. Description of Related Art

A PCI-E slot of a motherboard is powered by a 3.3V dual power supply. Since power is supplied even when the motherboard is in S5 (soft shutdown) status, unnecessary power consumption occurs while the PCI-E slot has a PCI-E device seated therein. Consequently, the requirements of Energy using Products (EuP) of the European Commission may not be met when it limits system power consumption in S5 status to 1 watt.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

The FIGURE is a circuit diagram of a preferred embodiment of a power supply circuit for a PCI-E slot of the present disclosure.

DETAILED DESCRIPTION

As shown in the FIGURE, a preferred embodiment of a power supply circuit for a PCI-E slot of the present disclosure includes a control chip, a first electronic switch Q1, and a second electronic switch Q2. The first electronic switch Q1 and the second electronic switch Q2 are respectively n-type and p-type field effect transistors in this embodiment.

The gate of the first field effect transistor Q1 is connected to the control chip to receive a control signal PCIE_PWR_CTL from the control chip, and connected to a 3.3V dual power supply +3.3V_DUAL through a resistor R1. The source of the first field effect transistor Q1 is grounded. The drain of the first field effect transistor Q1 is connected to the gate of the second field effect transistor Q2, and connected to the 3.3V dual power supply +3.3V_DUAL through a resistor R2. The drain of the second field effect transistor Q2 is connected to a PCI-E slot 5. The source of the second field effect transistor Q2 is connected to the 3.3V dual power supply +3.3V_DUAL.

In this embodiment, the control chip is a super I/O chip 6 on a motherboard. The super I/O chip 6 determines the status of the motherboard and outputs the control signal PCIE_PWR_CTL.

If the motherboard is in S5 status, the super I/O chip 6 outputs the control signal PCIE_PWR_CTL with low potential to turn off the first field effect transistor Q1. When the first field effect transistor Q1 is off, the gate of the second field effect transistor Q2 is pulled high thereby turning the second field effect transistor Q2 off. As a result, the PCI-E slot 5 is no longer powered by the 3.3V dual power supply +3.3V_DUAL, and the PCI-E device connected to the PCI-E slot 5 becomes inactive.

If the motherboard is in S0-S4 status, the super I/O chip 6 outputs the control signal PCIE_PWR_CTL with high potential to turn on the first field effect transistor Q1. When the first field effect transistor Q1 is on, the gate of the second field effect transistor Q2 is pulled low thereby turning the second field effect transistor Q2 on. As a result, the 3.3V dual power supply +3.3V_DUAL powers the PCI-E slot 5.

In the operations described, it can be seen that the first field effect transistor Q1 and the second field effect transistor Q2 behave as electronic switches in the circuit. Hence, in other embodiments, the first field effect transistor Q1 and the second field effect transistor Q2 can be substituted for other types of transistors or other electronic components with electronic switching functionality For instance, if the first field effect transistor Q1 is substituted for a NPN-type bipolar junction transistor, the base of the transistor is corresponded to the gate of the first field effect transistor Q1, the collector of the transistor is corresponded to the drain of the first field effect transistor Q1, and the emitter of the transistor is corresponded to the source of the first field effect transistor Q1. The bipolar junction transistor Q1 includes a first terminal, a second terminal, and a third terminal. The first terminal receives the PCI-E control signal PCIE_PWR_CTL, turning on/off the second terminal and the third terminal. The second terminal is grounded. The third terminal is connected to the 3.3V dual power supply +3.3V_DUAL through the resistor R2. When bipolar junction transistors are taken as the electronic switches of the circuit, the design other portions of the circuit can be changed accordingly.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A power supply circuit for a PCI-E slot comprising:
   a control chip, wherein the control chip determines the status of a motherboard, outputting a control signal;
   a first electronic switch including a first terminal, a second terminal, and a third terminal, wherein the first terminal is connected to the control chip to receive the control signal and connected to a 3.3V dual power supply of the motherboard through a first resistor, the second terminal is grounded, the third terminal is connected to the 3.3V dual power supply through a second resistor; and
   a second electronic switch including a first terminal, a second terminal, and a third terminal, wherein the third terminal of the first electronic switch is further connected to the first terminal of the second electronic switch, the second terminal of the second electronic switch is connected to the 3.3V dual power supply, the third terminal of the second electronic switch is connected to a PCI-E slot.

2. The power supply circuit for a PCI-E slot of claim 1, wherein the first electronic switch is a field effect transistor, the gate of the field effect transistor corresponds to the first terminal of the first electronic switch, the source of the field effect transistor corresponds to the second terminal of the first electronic switch, the drain of the field effect transistor corresponds to the third terminal of the first electronic switch.

3. The power supply circuit for a PCI-E slot of claim 1, wherein the second electronic switch is a field effect transistor, the gate of the field effect transistor corresponds to the first terminal of the second electronic switch, the source of the field effect transistor corresponds to the second terminal of the second electronic switch, the drain of the field effect transistor corresponds to the third terminal of the second electronic switch.

4. The power supply circuit for a PCI-E slot of claim 1, wherein the control chip is a super I/O chip.

* * * * *